United States Patent [19]

Kroll

[11] 3,791,111

[45] Feb. 12, 1974

[54] FILTER DEVICE

[76] Inventor: Gert Wolfgang Kroll, 18 Bayernstrasse, Hosel near Dusseldorf, Germany

[22] Filed: Apr. 30, 1973

[21] Appl. No.: 355,451

Related U.S. Application Data

[63] Continuation-in-part of Ser. No. 77,651, Oct. 2, 1970, abandoned.

[52] U.S. Cl.................................. 55/341, 55/379
[51] Int. Cl............................................ B01d 46/02
[58] Field of Search...................... 55/341, 379, 302

[56] References Cited
UNITED STATES PATENTS

| | | | |
|---|---|---|---|
| 3,377,783 | 4/1968 | Young | 55/302 |
| 3,421,295 | 1/1969 | Swift et al. | 55/341 |

Primary Examiner—Bernard Nozick
Attorney, Agent, or Firm—Malcolm W. Fraser

[57] ABSTRACT

A gas filtering device in which a series of filter units are arranged parallely within a housing. Each filter unit comprises a frame about which fabric filter is wrapped to form parallel sides, thereby providing a filter pocket. The filter units are inserted into a casing through slots in a casing wall. The free edge of the filter fabric is wound around a sealing ring so as to form a welt. A sheet metal cover strip closes the open front side of each frame, clamps the welt against the casing wall at the slot edges, and this cover has a tubular connector disposed outside of the housing and affording sole access to the filter pocket.

3 Claims, 3 Drawing Figures

3,791,111

FILTER DEVICE

RELATED APPLICATION

Kroll Ser. No. 77,651 filed Oct. 2, 1970, for FILTERING DEVICE of which this application is a continuation-in-part now abandoned.

FIELD OF INVENTION

Gas Separation, Two or More Separators, Spaced for parallel flow of gas.

PRIOR ART

Young U.S. Pat. No. 3,377,783; Swift et al. U.S. Pat. No. 3,421,295; Byers U.S. Pat. No. 3,590,562

BACKGROUND OF THE INVENTION

The invention relates to a filtering device having several filter pockets, each consisting of a frame covered with filter material separating the soiled gas side from the pure gas side, and to which scavenging air may be applied for cleaning of the filter pockets.

The effective operation of such pocket filters is dependent to a high degree on the regular cleaning of the filter materials. The connection of the scavenging air necessary therefor must on the one hand function reliably, and on the other hand must require no excessive expenditure.

It is known in pocket filters to combine several filter pockets in one filter chamber, on whose pure gas side a valve arrangement is provided with which the cleaning air may be connected. With such a pocket filter, the clean gas chamber is relatively large. That is in itself a hindrance. In addition, however, the packings of the filters lie in the pure gas chamber, so that in the performance of the filter, infiltrated air or in case of nontightness of the pocket seal, also dirty air may be sucked in. Therefor, for a particularly reliable seal, care must be taken to this end, and this is expensive. Finally, the individual filter pockets of a chamber may be handled and serviced with difficulty, particularly since their installation and removal involve difficulties, as well as the subsequent covering of the filter cloth.

SUMMARY OF THE INVENTION

The technical problem serving as the basis for the invention is to overcome by means of a change in the clean gas side, particularly the disadvantages of the pocket filters described in the foregoing.

By means of the invention, the clean gas chamber is practically restricted to the volume of the frame spanned by the filter material. The sealing of the filter cloth extends out of the clean gas chamber. In addition, each filter pocket remains accessible from the outside and may also be cleaned individually with scavenging air.

Countless advantages result therefrom: The problems of sealing the filter pockets are greatly reduced. The sucking in of infiltrated air is, therefore, reduced or prevented by simple means. Beyond this, even upon non-perviousness of the pocket seal, no soiled air is sucked into the clean gas chamber. The retightening of the insertion or installation and removal of filter pockets as well as other maintenance work require substantially less expenditure than formerly. Furthermore, the decrease according to volume of the clean gas chamber contributes altogether to a more compact type of construction of the pocket filter.

For the fastening of the filter pockets to the open front side of the frame, sheet metal covers, each having a pipe directed outwardly, are employed for attachment to a tube leading to the cleaning device.

Figure 1:
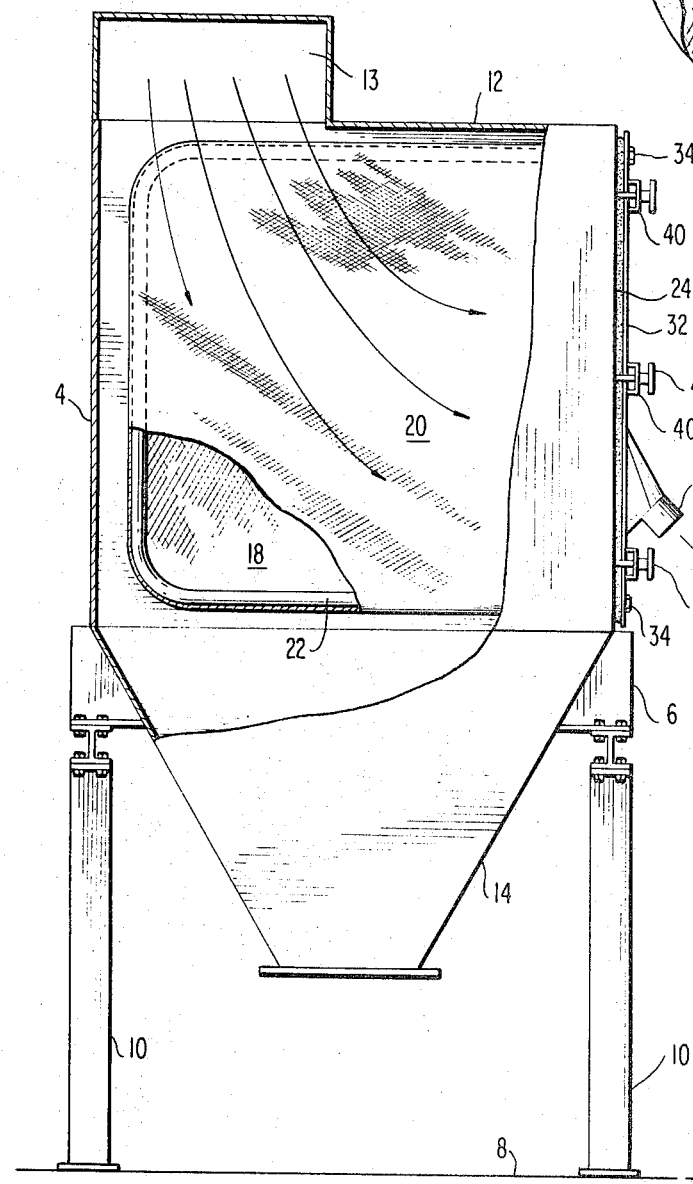
FIG. 1 is a side elevation, partly broken away to show the interior, of the filtering device.
Figure 1A:
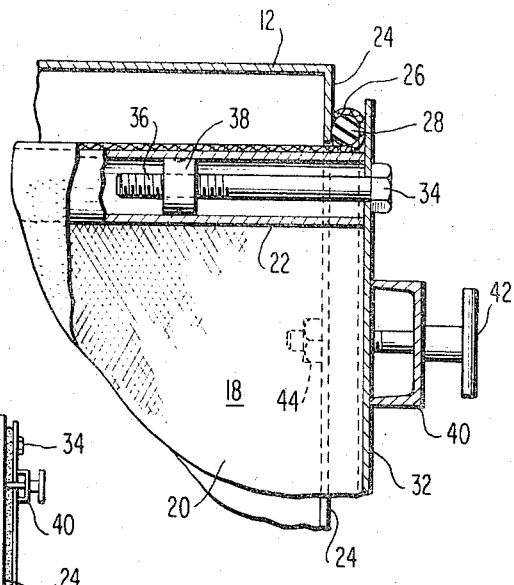
FIG. 1A is an enlarged fragmentary detail of the portions of the filtering device shown in the upper right-hand corner of FIG. 1.

Referring now to the drawings in which like reference numerals denote similar elements, the filtering device 2 comprises a sheet metal case 4 mounted on a frame 6 which is supported above floor 8 by legs 10. Extending across the rear portion of the top wall 12 of the casing is a duct 13 which is open at one end for connection with a source of dust laden air, generally at below atmospheric pressure. Depending from the bottom of the casing is a funnel-shaped hopper 14 into which the dust falls. Across the front of the casing are a series of nozzles 16 through which the clean filtered air passes. The nozzles 16 are part of metal strips 32 which are clamped to the front side of the casing 4. The clean air duct to which the nozzles are connected is generally at reduced pressure. For purging the filtering device, the nozzles 16 are connected to conventional hoses which, in turn, may be connected to a suitable purging device, by means of which back-pressure air is fed sequentially through individual ones of nozzles 16 into the individual filtering units within casing 4, which are described hereinafter, so that the exteriors of the filter bags of these units can be purged of dust collected thereon.

Figure 2:
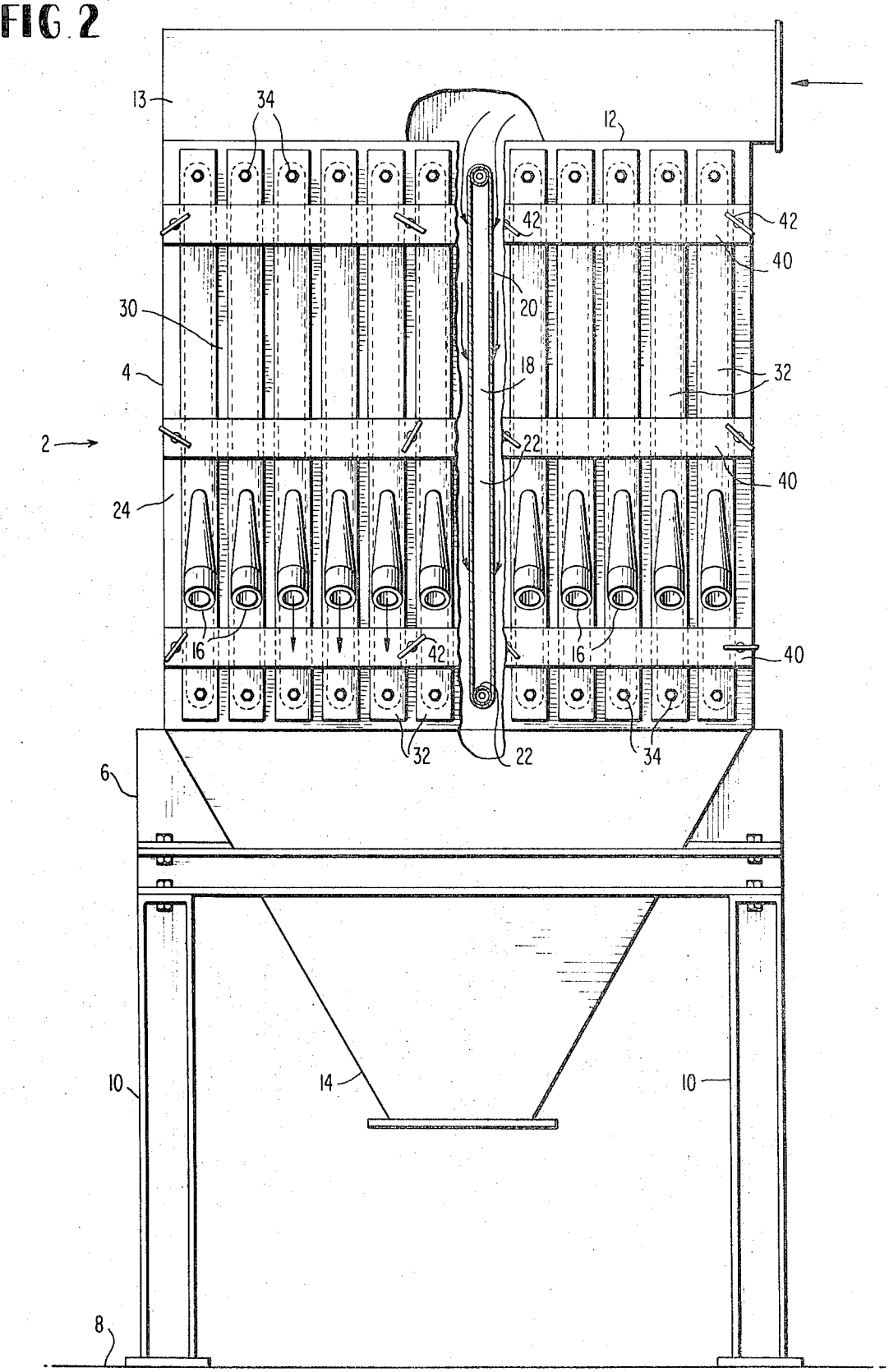
FIG. 2 is a front elevation of the filtering device, partly broken away.

Within casing 4 are a plurality of filter pockets 18 each formed by a fabric filter bag 20 stretched over a U-frame 22, which, in this example, is a tube. The filter bags are individually insertable into and removable from casing 4 through vertical slots in the front wall 24 of casing 4. The free edges 26 of the filter bags are turned over sealing rings 28, band sewn together, and engage against the lands 30 between the slots in front wall 24 and, of course, against the portions of the front wall at the upper and lower ends of the slots and at the sides of the first and last slots as seen in FIG. 2. The sealing rings 28 are clamped against the aforementioned portions of the front wall by metal strips 32 which support the respective clean air nozzles 16. In addition to clamping the sealing rings 28 against the front wall of the casing adjacent the vertical slots, these strips 32 serve to close the otherwise open ends of the filter bags. Each metal strip 32 is secured by bolts 34 to the free ends of a U-frame 22, the shanks 36 of bolts 34 threadedly engaging with nuts 38 secured within the free ends of the tubular U-frame 22. The strips 32 are forced towards the front wall 24 of casing 4 by means of U bars which, in turn, are tightly engaged against the strips by means of clamp screws 42 whose inner ends threadedly engage nuts 44 affixed on the inner sides of front casing wall 24.

When it is desired to replace or inspect a filter bag, this can easily be done by unclamping U bars 40 and removing a filter unit which consists of a filter bag 20, the U frame 22 over which the bag is stretched and the metal strip 32 which is bolted to the ends of the U frame. The sealing rings 28 greatly reduce the likelihood that any leakage around the free edges of the filter bags will occur; but, if any such leakage does occur, relatively clean air from the atmosphere surrounding casing 4 will be drawn into the filter pockets, rather than the dust-laden air which flows through the interior of casing 4. Conversely, if any leakage of dust laden air from within casing 4 occurs around the sealing rings 28, it will discharge into the atmosphere surrounding casing 4 rather than into a filter pocket 18.

In the following claims, where the terms "dust-laden air" or "clean air" are used, it will be understood that the terminology applies equally well to gases other than air.

I claim:

1. A filtering device comprising
a casing,
means for feeding dust laden air to the interior of the casing,
means at the bottom of the casing for collecting dust,
said casing having a wall with a plurality of slots therein,
a plurality of filter units insertable into and removable from said casing through said slots, each comprising
a U-frame,
a fabric filter bag stretched over the U-frame,
a strip having a clean air nozzle passage,
means securing the free ends of the U-frame to the strip,
said strip normally closing the open end of the filter bag and the free edges of the bag engaging between the strip and the outer side of the casing wall surrounding a slot,
and means for forcing said strips towards the outer side of said casing wall so as to clamp the free edges of said filter bags therebetween.

2. The combination claimed in claim 1, the means for forcing said strips towards the outer side of the casing wall comprising a plurality of bars engaging across the strips, and clamp screw means engaging between said bars and said casing wall.

3. The combination claimed in claim 1, the free edge of each filter bag being turned over a sealing ring which, together with said free edge, is clamped between a strip and said casing wall.

* * * * *